United States Patent
Kim et al.

(10) Patent No.: US 7,830,184 B2
(45) Date of Patent: Nov. 9, 2010

(54) FREQUENCY MULTIPLIER

(75) Inventors: Chul-Woo Kim, Seoul (KR); Jin-Han Kim, Suwon-si (KR); Seok-Ryung Yoon, Seoul (KR); Young-Ho Kwak, Seoul (KR); Seok-Soo Yoon, Changwon-si (KR)

(73) Assignee: Korea University Industry and Academy Cooperation Foundation, Seoul (KR)

( * ) Notice: Subject to any disclaimer, the term of this patent is extended or adjusted under 35 U.S.C. 154(b) by 542 days.

(21) Appl. No.: 11/659,023

(22) PCT Filed: Jul. 27, 2005

(86) PCT No.: PCT/KR2005/002434

§ 371 (c)(1),
(2), (4) Date: Mar. 3, 2008

(87) PCT Pub. No.: WO2006/033518

PCT Pub. Date: Mar. 30, 2006

(65) Prior Publication Data

US 2009/0189652 A1 Jul. 30, 2009

(30) Foreign Application Priority Data

Sep. 24, 2004 (KR) ............... 10-2004-0076826

(51) Int. Cl.
*H03B 19/00* (2006.01)
(52) U.S. Cl. ..................... 327/116; 327/119; 377/47
(58) Field of Classification Search ............. 327/116, 327/119–122; 377/47, 48

See application file for complete search history.

(56) References Cited

U.S. PATENT DOCUMENTS 6,353,648 B1 * 3/2002 Suzuki .................. 375/376

(Continued)

FOREIGN PATENT DOCUMENTS

KR 99-0044993 A 6/1999

(Continued)

OTHER PUBLICATIONS

International Preliminary Report on Patentability dated Jan. 9, 2007, for corresponding International Application No. PCT/KR2005/002434, listing the cited reference and WO 04/042721 A1 previously cited in an IDS on Jan. 30, 2007.

(Continued)

*Primary Examiner*—Lincoln Donovan
*Assistant Examiner*—William Hernandez
(74) *Attorney, Agent, or Firm*—Christie, Parker & Hale, LLP (57) ABSTRACT

A frequency multiplier is disclosed. A plurality of voltage regulators each regulate levels of voltages at first and second common nodes in response to a corresponding one of input signals from a voltage-controlled delay line. An input buffer charges the first node or discharges the second node in response to a feedback signal. An output buffer regulates a level of a voltage at an output node and outputs a frequency-multiplied clock signal and the feedback signal corresponding to the voltage level of the output node. A discharge circuit discharges the first node before a rising edge of each of the input signals from the voltage-controlled delay line is inputted. A charge circuit charges the second node before the rising edge of each of the input signals from the voltage-controlled delay line is inputted.

10 Claims, 9 Drawing Sheets

U.S. PATENT DOCUMENTS

2005/0174911 A1* 8/2005 Shutoku et al. ............ 369/59.1

FOREIGN PATENT DOCUMENTS

KR   1999-0044993   6/1999
WO   WO 2004/042721 A1   5/2004

OTHER PUBLICATIONS

International Search Report, dated Nov. 7, 2005, corresponding to PCT/KR2005/002434.

* cited by examiner

FREQUENCY MULTIPLIER

CROSS-REFERENCE TO RELATED APPLICATION

This application is a National Phase Patent Application of International Application Number PCT/KR2005/002434, filed on Jul. 27, 2005, which claims priority of Korean Patent Application Number 10-2004-0076826, filed on Sep. 24, 2004.

TECHNICAL FIELD

The present invention relates to a frequency multiplier, and more particularly to a frequency multiplier which is based on a delay locked loop using a voltage-controlled delay line.

BACKGROUND ART

Entering upon the $21^{st}$ century, the whole world has entered the information society. The information society is a community where people can come into contact with and freely use information anywhere any time. Rapid progress of microprocessors, above all else, can be regarded as the biggest technical factor enabling such information society. Since Intel announced the first microprocessor in the world, the 4004 microprocessor composed of 2,250 transistors with a 10-micron line width and having a speed of 108 KHz, in 1971, Samsung Electronics Co., Ltd. announced the Alpha processor running at 1 GHz in 2000 and Intel announced the 3 GHz Pentium 4 in December, 2002, so that microprocessor technology has now entered the age of "Beyond GHz". It is expected that an 11 GHz microprocessor in which one hundred million transistors with a 40-nanometer line width are integrated will be developed by 2010.

However, various problems occur as microprocessors become higher in integration and performance. Firstly, a System-on-Chip (SoC) increases in volume, resulting in increases in clock skew and clock frequency. As a result, the period of one cycle is shortened, thereby increasing the burden of jitter. Secondly, the higher the integration, the higher the power density, so there is also a need to take a low-power design into consideration.

Hence, research has been conducted into the design of a low-jitter, high-speed locking first-order phase locked loop (PLL) of a non-voltage-controlled oscillator (non-VCO) type useful to the design of a high-speed SoC. Most of the existing clock generators have employed PLLs with VCOs. However, the VCO is disadvantageous in that it not only accumulates jitter in output thereof for several oscillation periods, but also makes slow changes to various operation modes which are essential to low-power applications. In contrast, because a voltage-controlled delay line (VCDL) of a delay locked loop (DLL) is an open loop, it has the advantage of accumulating no jitter and being rapidly re-locked when switching operation modes. In addition, the DLL maintains stability with a first-order system and has a loop filter easy to integrate. However, since the DLL does not employ a frequency divider, it has difficulty in frequency multiplication and, in turn, high-speed clock generation. The following Table 1 shows a comparison in advantages and disadvantages between the PLL and the DLL.

TABLE 1

| PLL | DLL |
| --- | --- |
| VCO | VCDL |
| jitter accumulated (closed loop) | no jitter accumulated (open loop) |
| higher-order system | first-order system |
| sometimes unstable | always stable |
| difficult to design | easy to design |
| large area required to integrate loop filter | easy to integrate loop filter |
| little influenced by reference signal jitter characteristics | influenced by reference signal jitter characteristics |
| easy to multiply frequency | difficult to multiply frequency |

Therefore, a low-jitter, high-speed locking first-order PLL will be designed to lock a high-speed clock signal on the basis of a DLL with such various advantages. To this end, first, a high-speed frequency multiplier will be designed with improved error. As a result, it will be possible to generate a low-jitter, high-speed clock signal even with the DLL. Next, frequency multiplication will be dynamically performed so that a microprocessor can operate at a frequency optimal to a given state. Finally, the clock of a frequency obtained as a result of the frequency multiplication will be synchronized with an input clock, thereby making it possible to replace a PLL which is an existing high-speed clock generator with a low-jitter, high-speed locking first-order PLL which operates more stably.

Figure 1:
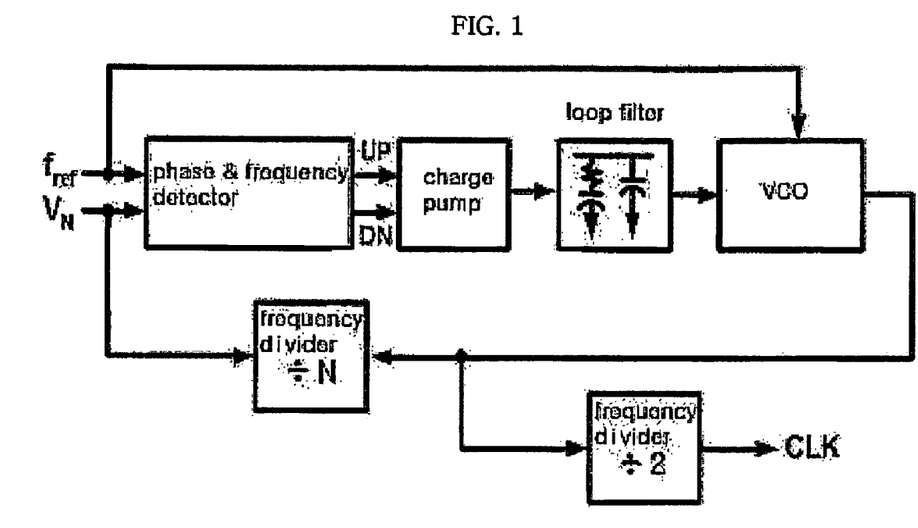
FIGS. 1 and 2 are block diagrams showing the configurations of a PLL-based high-speed clock generator and DLL-based high-speed clock generator, respectively.
Figure 2:
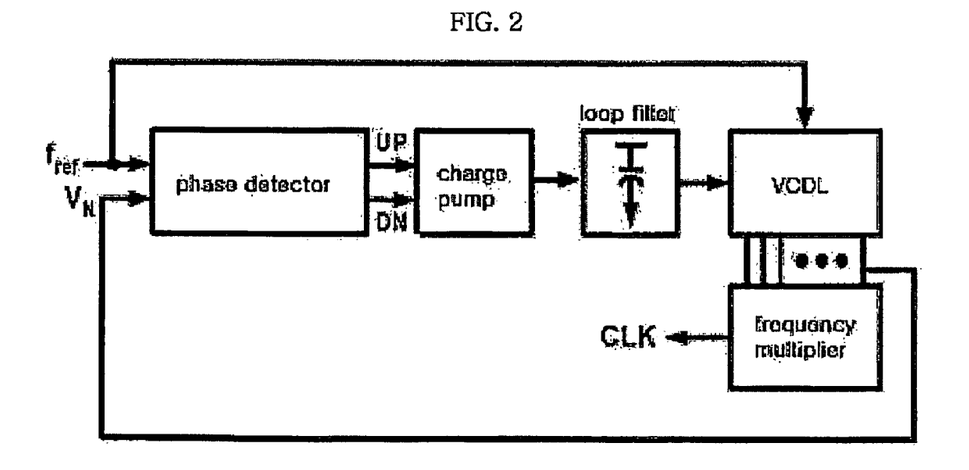
Figure 3A:
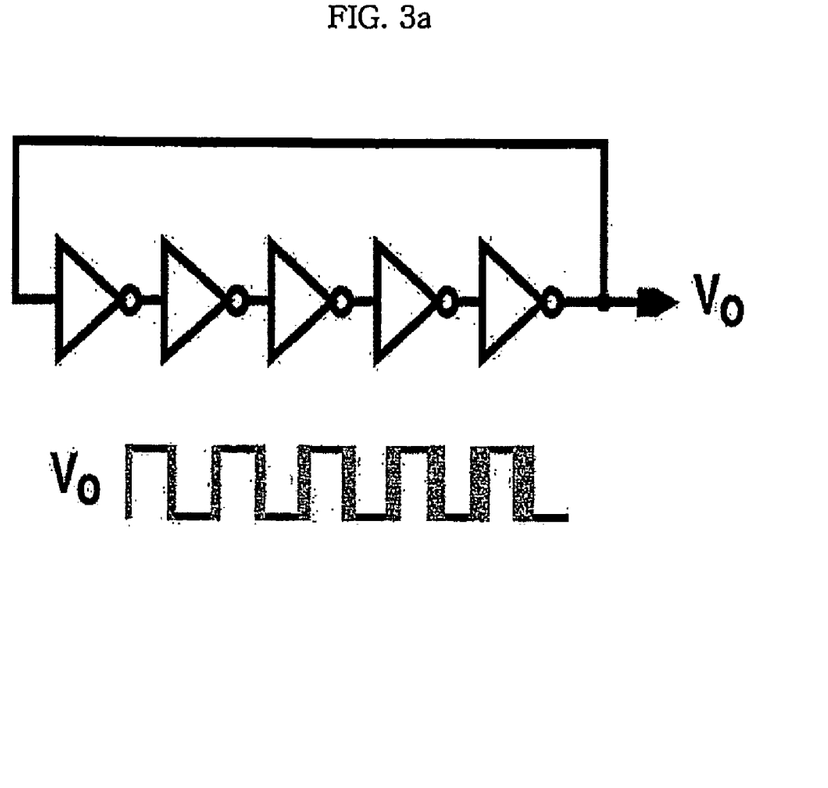
FIGS. 3a and 3b are views showing jitters accumulated in a PLL and DLL, respectively.
Figure 3B:
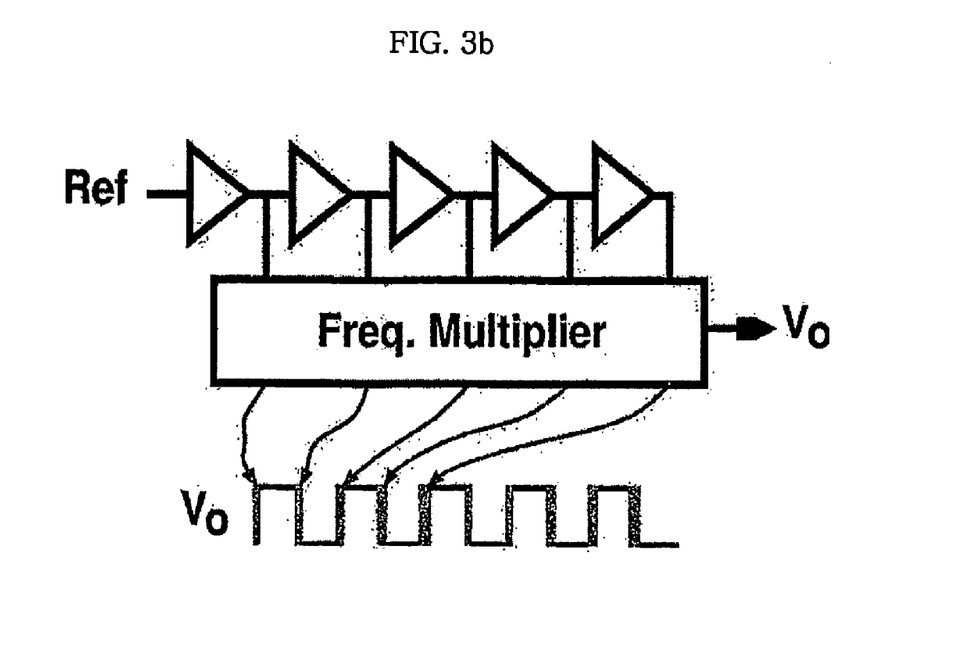

FIGS. 1 and 2 are block diagrams of two typical high-speed clock generators. FIG. 1 shows the configuration of a high-speed clock generator based on a PLL. The PLL-based clock generator includes a VCO and two frequency dividers. One of the frequency dividers is a 1/N-frequency divider which multiplies the frequency of a reference input signal by N, and the other is a ½-frequency divider which allows the output of the VCO to have a duty ratio of 50%. This PLL-based clock generator has a disadvantage in that jitter is accumulated in the output of the VCO. That is, as shown in FIG. 3a, if power noise is present in the VCO, the edge of each clock of the VCO is subject to phase distortion, which is continuously accumulated. In contrast, a DLL using a VCDL has the advantage of basically prohibiting the accumulation of jitter. Namely, as shown in FIG. 3b, because the VCDL is an open loop, jitter has no effect on the next clock period even though it occurs.

Accordingly, a frequency multiplier is an important block in designing a high-speed clock generator based on the DLL. In the last 2 to 3 years, some frequency multiplication techniques using the DLL have been reported and have shown that a low-jitter clock generator and low-phase error local oscillator using the DLL are excellent. For example, one frequency multiplication technique using the DLL may be a DLL-based local oscillator for personal communication service (PCS) which performs a frequency multiplication operation using an edge combiner. Another technique may be a DLL-based frequency synthesizer using AND and OR gates which obtains a frequency multiplication ratio of 9 so that it can generate a high-speed clock signal of 1 GHz. However, in the frequency multiplier for the PCS, an LC tank of an output node which is used to increase a load impedance at a resonance frequency requires a large area, and an inductor with a low Q value which is used to obtain low close-in phase noise must allow a large amount of current to flow therethrough, in order to obtain desired output swing.

The frequency multiplier for the PCS has a further disadvantage in that the multiplication ratio cannot be changed once the value of the LC tank is decided. The DLL-based frequency synthesizer using the AND and OR gates has a limitation in reducing peak-to-peak jitter because the AND and OR gates are sensitive to power noise. Further, the frequency synthesizer is disadvantageous in that a pull-up resistor of 50Ω must be provided outside of a chip so as to be used for an analog input/output buffer and the multiplication ratio is fixed.

DISCLOSURE

Technical Problem

Therefore, the present invention has been made in view of the above problems, and it is an object of the present invention to provide a frequency multiplier which is capable of reducing jitter during generation of a high-speed clock signal to obtain a low jitter characteristic, being small in area and power consumption and dynamically varying a frequency multiplication ratio.

Technical Solution

In accordance with the present invention, the above and other objects can be accomplished by the provision of a frequency multiplier comprising: a plurality of voltage regulators connected in parallel between first and second common nodes, each of the voltage regulators regulating levels of voltages at the first and second nodes in response to a corresponding one of input signals from a voltage-controlled delay line; an input buffer for charging the first node or discharging the second node in response to a feedback signal; an output buffer driven by the voltage level of any one of the first and second nodes for regulating a level of a voltage at an output node and outputting a frequency-multiplied clock signal and the feedback signal corresponding to the voltage level of the output node; a discharge circuit connected to the first node for discharging the first node before a rising edge of each of the input signals from the voltage-controlled delay line is inputted; and a charge circuit connected to the second node for charging the second node before the rising edge of each of the input signals from the voltage-controlled delay line is inputted.

Advantageous Effects

According to the present invention, a frequency multiplier can remove a parasitic capacitance between internal nodes thereof to operate at high speed. The frequency multiplier can also be miniaturized by employing a phase interpolator which can be implemented with a digital circuit and be simply and conveniently designed. In addition, the frequency multiplier can dynamically control a frequency multiplication ratio by employing an N to K multiplexer.

DESCRIPTION OF DRAWINGS

The above and other objects, features and other advantages of the present invention will be more clearly understood from the following detailed description taken in conjunction with the accompanying drawings, in which.

BEST MODE

Figure 4:
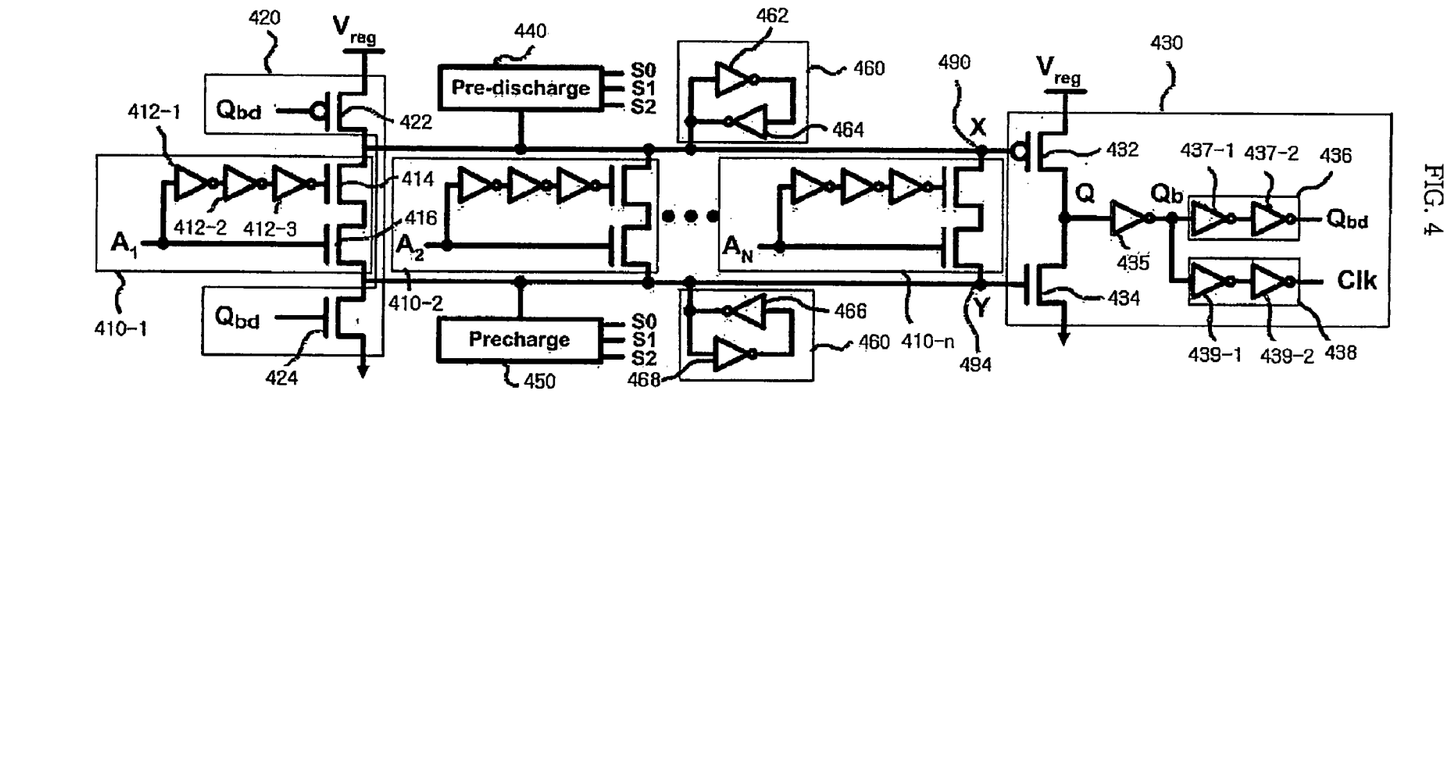
FIG. 4 is a circuit diagram of a frequency multiplier according to the present invention.

FIG. 4 is a circuit diagram of a frequency multiplier according to the present invention.

With reference to FIG. 4, the frequency multiplier according to the present invention comprises a plurality of voltage regulators 410-1 to 410-$n$, an input buffer 420, an output buffer 430, a discharge circuit 440, a charge circuit 450, a voltage stabilizer 460, a phase interpolator 470, and a multiplexer 480.

The voltage regulators 410-1 to 410-$n$ are the same in number as input signals $A_1$ to $A_N$ from a voltage-controlled delay line (VCDL), and are connected in parallel between common nodes X and Y 490 and 494. Each of the voltage regulators 410-1 to 410-$n$ acts to regulate the levels of voltages at the nodes X and Y 490 and 494 in response to a corresponding one of the input signals $A_1$ to $A_N$ from the VCDL.

To this end, each of the voltage regulators 410-1 to 410-$n$ includes three inverters 412-1 to 412-3 and two N-channel Metal-Oxide Semiconductor (NMOS) transistors 414 and 416. The three inverters 412-1 to 412-3 in each of the voltage regulators 410-1 to 410-$n$ are connected in series to delay the corresponding one of the input signals $A_1$ to $A_N$ from the VCDL for a predetermined period of time. The output of the last inverter 412-3 is applied to a gate terminal of the first NMOS transistor 414, a first terminal of which is connected to the node X 490. The corresponding one of the input signals $A_1$ to $A_N$ from the VCDL is applied to a gate terminal of the second NMOS transistor 416 in each of the voltage regulators 410-1 to 410-$n$. The second NMOS transistor 416 has a first terminal connected to a second terminal of the first NMOS transistor 414 and a second terminal connected to the node Y 494. When the corresponding one of the input signals $A_1$ to $A_N$ from the VCDL is inputted to each of the voltage regulators 410-1 to 410-$n$, the first and second NMOS transistors 414 and 416 in each of the voltage regulators 410-1 to 410-$n$ are turned on to move data between the node X 490 and the node Y 494, so as to change the voltage level of the node X 490 or node Y 494.

The input buffer 420 acts to charge the node X 490 or discharge the node Y 494 in response to a feedback signal from the output buffer 430. To this end, the input buffer 420 includes a first P-channel Metal-Oxide Semiconductor (PMOS) transistor 422 and a third NMOS transistor 424. The first PMOS transistor 422 has a first terminal connected to a voltage $V_{reg}$ regulated to be unaffected by power noise and a second terminal connected to the node X 490. The first PMOS transistor 422 also has a gate terminal for receiving the feedback signal from the output buffer 430. With this configuration, the first PMOS transistor 422 regulates the voltage level of the node X 490 in response to the feedback signal. The third NMOS transistor 424 has a first terminal connected to the node Y 494 and a second terminal connected to a ground terminal. The third NMOS transistor 424 also has a gate terminal for receiving the feedback signal from the output buffer 430. With this configuration, the third NMOS transistor 424 regulates the voltage level of the node Y 494 in response to the feedback signal.

The output buffer 430 is driven by the voltage level of any one of the nodes X and Y 490 and 494 to regulate the level of a voltage at an output node Q and output a frequency-multiplied clock signal and the feedback signal corresponding to the voltage level of the output node Q. To this end, the output buffer 430 includes a second PMOS transistor 432, a fourth NMOS transistor 434, an output inverter 435, a feedback signal output stage 436, and a clock signal output stage 438.

The second PMOS transistor 432 has a first terminal connected to the regulated voltage $V_{reg}$ and a second terminal connected to the output node Q. The second PMOS transistor 432 is driven by the level of the voltage at the node X 490, inputted to a gate terminal thereof, to regulate the voltage level of the output node Q. The fourth NMOS transistor 434 has a first terminal connected to the output node Q and a second terminal connected to the ground terminal. The fourth NMOS transistor 434 is driven by the level of the voltage at the node Y 494, inputted to a gate terminal thereof, to regulate the voltage level of the output node Q. The output inverter 435 inverts an output signal from the output node Q and outputs the inverted signal to the feedback signal output stage 436 and clock signal output stage 438. The feedback signal output stage 436 includes a plurality of inverters 437-1 and 437-2 connected in series to the output inverter 435 for delaying the output signal from the output inverter 435 for a predetermined period of time and providing the delayed signal as the feedback signal to the first PMOS transistor 422 and third NMOS transistor 424. The clock signal output stage 438 includes a plurality of inverters 439-1 and 439-2 connected in series to the output inverter 435 for delaying the output signal from the output inverter 435 for a predetermined period of time and providing the delayed signal as the frequency-multiplied clock signal.

Figure 5:
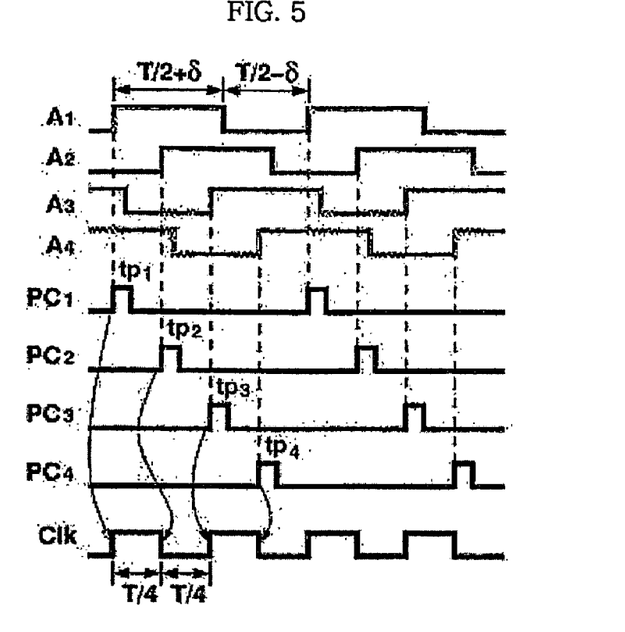
FIG. 5 is a timing diagram illustrating frequency multiplication by the frequency multiplier according to the present invention.

FIG. 5 is a timing diagram illustrating frequency multiplication by the frequency multiplier according to the present invention. The operation of the frequency multiplier shown in FIG. 4 will hereinafter be described with reference to FIG. 5.

If the feedback signal $Q_{bd}$ provided from the feedback signal output stage 436 becomes "High", the node Y 494 is discharged to "Low" through the third NMOS transistor 424 and the node X 490 is maintained at the previous "High" level. If the input signal $A_1$ from the VCDL rises, the first NMOS transistor 414 and second NMOS transistor 416 are turned on and then remain on for a brief period of time $tp_1$, thereby causing data to be moved between the node X 490 and the node Y 494. Thereafter, if the feedback signal $Q_{bd}$ makes a "High" to "Low" transition, the node X 490 is discharged to "Gnd" through the first to third NMOS transistors 414, 416 and 424. When the node X 490 is changed from "High" to "Low", the second PMOS transistor 432 is turned on, thereby causing a node Q, which is the output node Q, to make a "Low" to "High" transition. Subsequently, the output signal of "High" level from the output node Q is delayed and inverted through the three inverters 435, 437-1 and 437-2 and then provided as the feedback signal $Q_{bd}$ of "Low" level. As a result, the first PMOS transistor 422 is turned on in response to the feedback signal $Q_{bd}$, so as to charge the node X 490 to "High".

Next, if the input signal $A_2$ from the VCDL rises, data is moved between the node X 490 and the node Y 494 in a similar manner to that when the input signal $A_1$ from the VCDL rises. In this case, the voltage at the node Y 494 drives the fourth NMOS transistor 434, so as to discharge the output node Q, to "Low". In this manner, an output clock signal, which is the frequency-multiplied clock signal, is inverted in level at every rising edge of a buffered version "$A_i$" of each input signal from the VCDL. Although four rising edges have been disclosed as being generated for multiplication of an input frequency by 2, the present invention is not limited thereto. For example, the frequency multiplier of the present invention may be implemented to multiply an input frequency by N/2 if N rising edges of the input signal $A_i$ are generated, as in Equation 1 below. In this case, the frequency multiplication ratio can be dynamically adjusted by adjusting the number of rising edges of the input signal $A_i$.

$$f_{Clk} = f_{Ref} \times \frac{N}{2} \qquad \text{[Equation 1]}$$

As can be seen from the above description, the frequency multiplier according to the present invention has the advantage of, by virtue of digitization, occupying a small area, consuming a small amount of power and adjusting a frequency multiplication ratio.

Meanwhile, the voltage $V_{reg}$ regulated to be unaffected by power noise is inputted to the input buffer 420 and output buffer 430, and the N input signals $A_1$ to $A_N$ delayed by the VCDL are inputted to the frequency multiplier, for frequency multiplication. Note that a conventional frequency multiplier has a limitation in operating at high speed because parasitic capacitances of the node X and the node Y increases when a larger number of taps are provided. In contrast, in the frequency multiplier of the present invention, a discharge block and a charge block are additionally connected to the node X and the node Y, respectively, in order to overcome such a problem.

The discharge circuit 440 is connected to the node X 490 to discharge the node X 490 to change the voltage level thereof to "Low", before a rising edge of each of the input signals $A_1$ to $A_N$ from the VCDL is inputted.

The charge circuit 450 is connected to the node Y 494 to charge the node Y 494 to change the voltage level thereof to "High", before the rising edge of each of the input signals $A_1$ to $A_N$ from the VCDL is inputted. The discharge circuit 440 and charge circuit 450 each include a plurality of transmission gates which are selectively turned on according to the frequency multiplication ratio to reduce the number of phase changes of the output node Q.

In order to generate a high-speed clock signal of 1.5 GHz or more, the voltage levels of the node X 490 and node Y 494 must rapidly vary to satisfy the following Equation 2. The reason is that it is required to make phase changes through at least three inverters until the node X 490 or node Y 494 is driven such that the feedback signal $Q_{bd}$ drives the first PMOS transistor 422 or third NMOS transistor 424.

$$\frac{1}{1.5G \times 2} > \quad \text{[Equation 2]}$$
$$t_{charge,X}(\text{or } t_{charge,Y}) + t_{d,P2}(\text{or } t_{d,N4}) + t_{d,I4} + t_{d,P1}(\text{or } t_{d,N3})$$

Accordingly, for generation of a clock signal of 1.1 GHz or more to which a high frequency multiplication ratio is applied, it is necessary to selectively perform predischarging of the node X 490 and precharging of the node Y 494. In this case, the frequency multiplier according to the present invention satisfies the following Equation 3.

$$\frac{T}{4} > t_{charge,X}(\text{or } t_{charge,Y}) + \quad \text{[Equation 3]}$$
$$t_{d,P2}(\text{or } t_{d,N4}) + t_{d,I4} + t_{d,P1}(\text{or } t_{d,N3}) > \frac{T}{2}$$

By selectively performing the precharging and predischarging, the node X 490 and the node Y 494 enables the output node 494 to be changed in phase only once, not twice, before rising edges of the next input signals is inputted.

The discharge circuit 440 and the charge circuit 450 each operate depending on the frequency multiplication ratio. For example, all three transmission gates in each circuit are turned on for generation of a clock signal of 1.6 GHz where the multiplication ratio is 4, two transmission gates are turned on for 1.4 GHz where the multiplication ratio is 3.5, and one transmission gate is turned on for 1.2 GHz where the multiplication ratio is 3.

Figure 6:
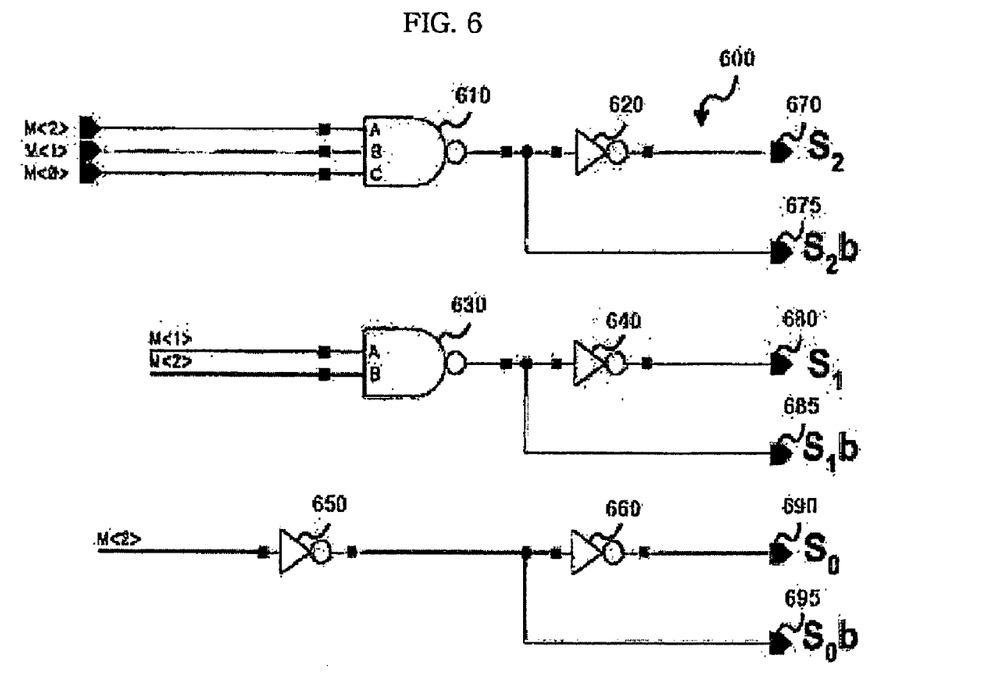
FIG. 6 is a detailed circuit diagram of a transmission gate control circuit which is provided in a discharge circuit or charge circuit to control an on operation of each transmission gate according to a frequency multiplication ratio.

FIG. 6 is a detailed circuit diagram of a transmission gate control circuit which is provided in each of the discharge circuit and charge circuit to control an on operation of each transmission gate according to the frequency multiplication ratio.

With reference to FIG. 6, the transmission gate control circuit, denoted by reference numeral 600, includes a plurality of NAND gates 610 and 630, and a plurality of inverters 620, 640, 650 and 660. The first NAND gate 610 receives respective bit values M<2>, M<1> and M<0> of the frequency multiplication ratio as inputs thereof and outputs a logic operation result to a first output terminal 670 through the first inverter 620 and directly to a second output terminal 675. The first inverter 620 inverts an output signal from the first NAND gate 610 and outputs the inverted signal to the first output terminal 670. The second NAND gate 630 receives the bit values M<2> and M<1> of the multiplication ratio as inputs thereof and outputs a logic operation result to a third output terminal 680 through the second inverter 640 and directly to a fourth output terminal 685. The second inverter 640 inverts an output signal from the second NAND gate 630 and outputs the inverted signal to the third output terminal 680. The third inverter 650 receives the bit value M<2> of the multiplication ratio as an input thereof, inverts it and outputs the resulting signal to a fifth output terminal 690 through the fourth inverter 660 and directly to a sixth output terminal 695. The fourth inverter 660 inverts the output signal from the third inverter 650 and outputs the inverted signal to the fifth output terminal 690.

Figure 7A:
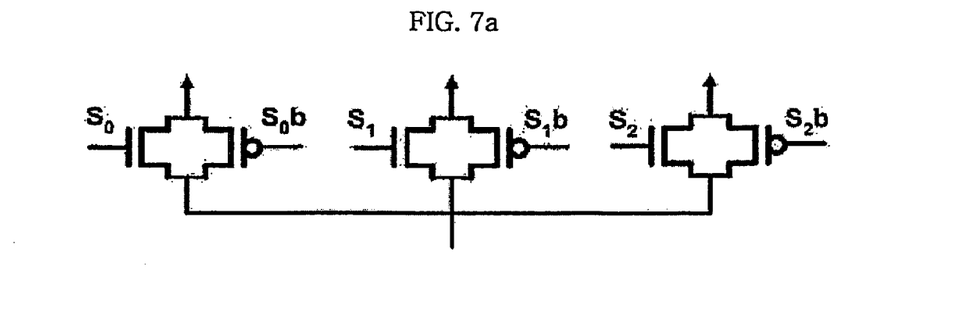
FIGS. 7a and 7b are detailed circuit diagrams of the discharge circuit and charge circuit, respectively.
Figure 7B:
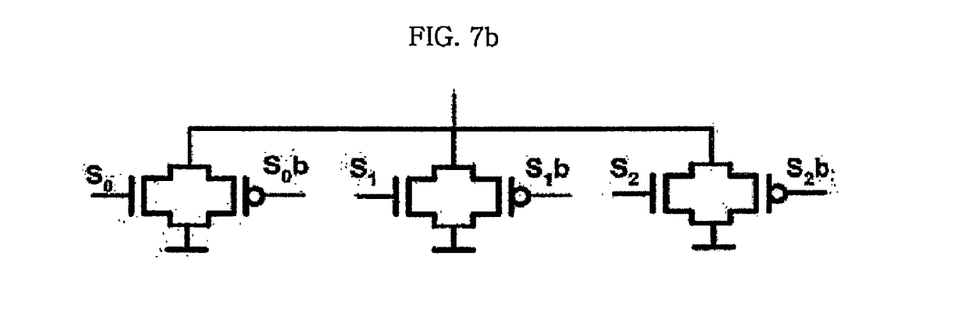

The transmission gate control circuit 600 of FIG. 6 adjusts discharging and charging rates of the discharge circuit 440 and charge circuit 450 of FIGS. 7a and 7b according to the frequency multiplication ratio to reduce a voltage swing width, so as to generate a high-speed clock signal. For example, if the bit values M<2>, M<1> and M<0> of the multiplication ratio are 1, 1, and 1, respectively, all three transmission gates of different sizes in each circuit are turned on. Also, two transmission gates corresponding to control signals $S_1$, $S_1 b$, $S_0$ and $S_0 b$ from the transmission gate control circuit 600 are turned on when the bit values M<2>, M<1> and M<0> are 1, 1, and 0, respectively, and one transmission gate corresponding to the control signals $S_0$ and $S_0 b$ from the control circuit 600 is turned on when the bit values M<2>, M<1> and M<0> are 1, 0, and 1, respectively. In this manner, the transmission gates in each of the discharge circuit 440 and charge circuit 450 are selectively turned on to adjust the discharging rate or charging rate of the corresponding circuit.

Figure 8:
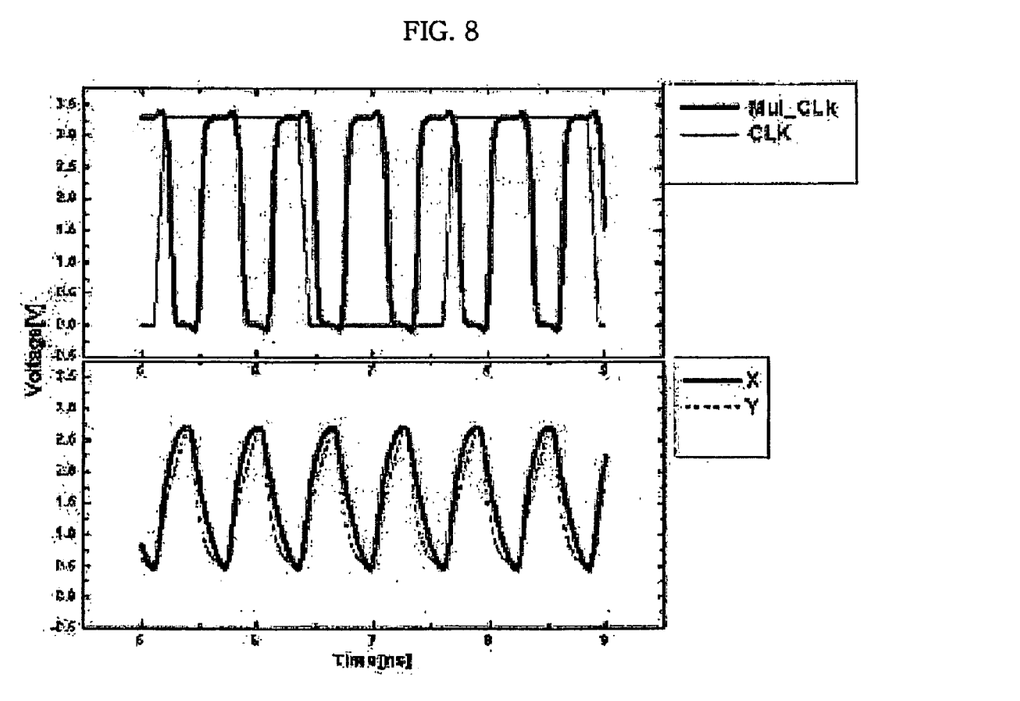
FIG. 8 is a graph showing simulation results of the frequency multiplier according to the present invention when it operates at 1.6 GHz.

FIG. 8 is a graph showing simulation results of the frequency multiplier according to the present invention when it operates at 1.6 GHz. Before a rising edge of the input signal $A_i$ is inputted, the node X or node Y begins to be predischarged or precharged so that it can be rapidly driven when the rising edge of the input signal $A_i$ is inputted. The simulation results of FIG. 8 show an error of 14 ps with respect to a period of 625 ps of a 1.6 GHz signal obtained by multiplying a reference input frequency of 400 MHz by 4. As a result, it can be seen that the frequency multiplier of the present invention attains the aim of achieving an error result of 15 ps at 1.5 GHz.

The voltage stabilizer 460 includes a plurality of inverters 462 and 464 and 466 and 468 connected in series for forming loops. The inverters 462 and 464 are connected to the node X 490 to stabilize the voltage at the node X 490, and the inverters 466 and 468 are connected to the node Y 494 to stabilize the voltage at the node Y 494.

In general terms, a high-speed clock generator based on a delay locked loop (DLL) does not accumulate jitter because it does not use a voltage-controlled oscillator (VCO), but has a factor causing continuous production of jitter. This factor results from the fact that the DLL directly uses the output of a VCDL, differently from a VCO which integrates an input frequency to generate an output clock. For this reason, the DLL-based clock generator may have an error derived from the VCDL, which is typically an inter-delay line error or static phase error. In the DLL-based clock generator, a plurality of branch delay lines of the VCDL must have the same delay time, but may have a delay error due to a difference in process or layout, which is the inter-delay line error. The static phase error is a phase error which results from an error in a phase detector or charge pump when a reference input signal and the output of the VCDL are locked.

Figure 9:
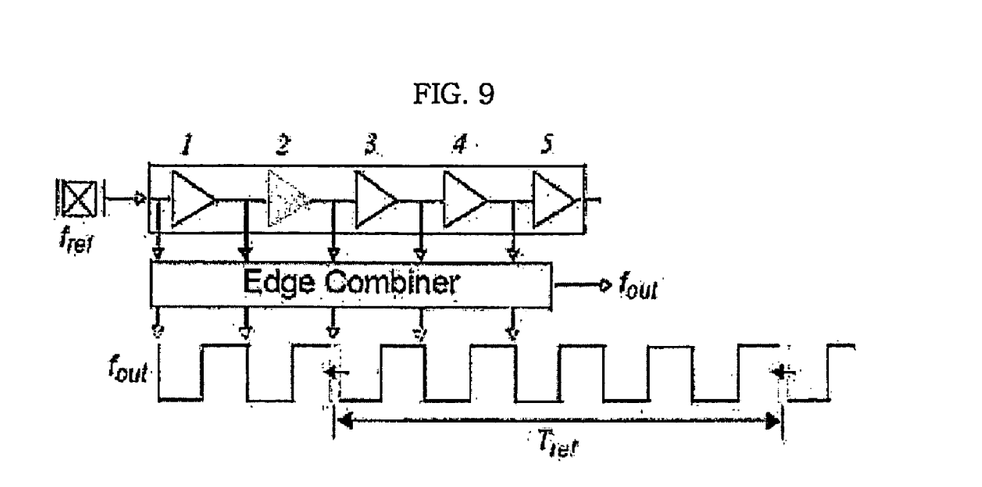
FIGS. 9 and 10 are views illustrating errors of a high-speed clock generator which occur due to an inter-delay line error and a static phase error, respectively.
Figure 10:
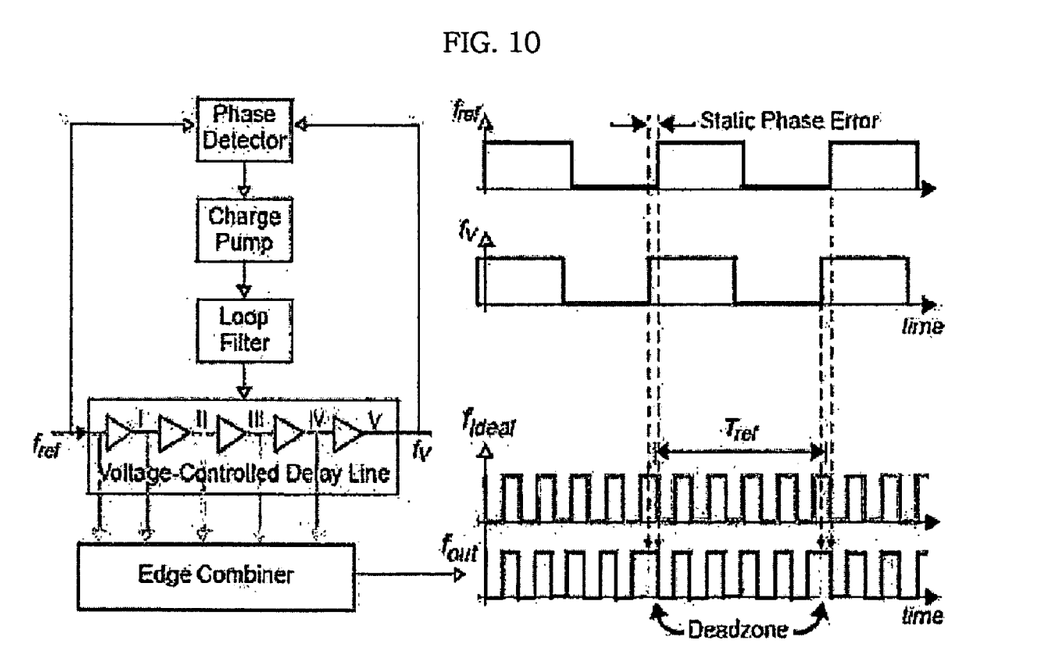

FIGS. 9 and 10 illustrate errors of a DLL-based high-speed clock generator which occur due to an inter-delay line error and a static phase error, respectively. With reference to FIGS. 9 and 10, in order to realize low jitter in the DLL-based high-speed clock generator, it is important to remove the inter-delay line error and static phase error. However, few methods have been proposed to remove the inter-delay line error and static phase error and, as well, a 900 MHz local oscillator using a DLL-based frequency multiplier technique for PCS applications, proposed by G. Chien and P. Gray, is very complex to design and occupies a large area.

Figure 11:
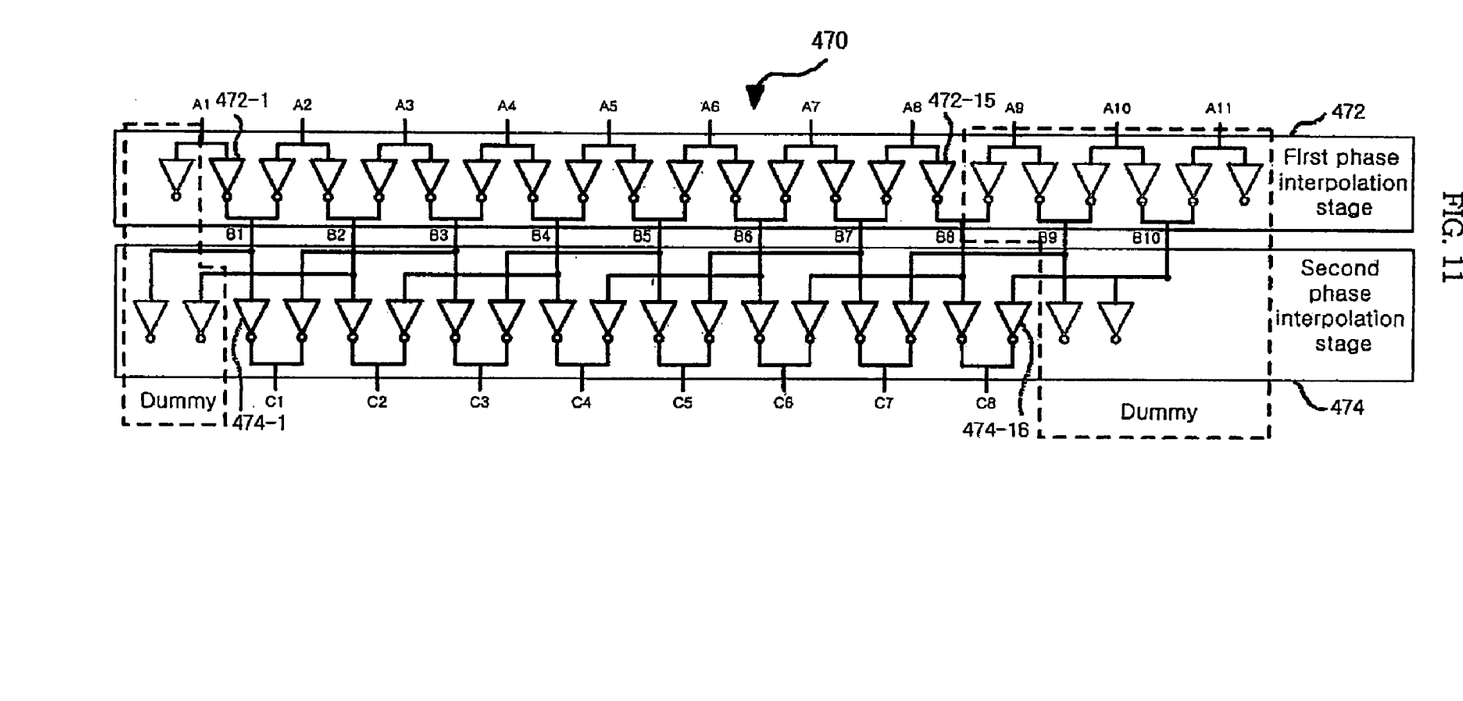
FIG. 11 is a circuit diagram showing an embodiment of a phase interpolator which is connected in common to branch delay lines of a VCDL which provide input signals to the frequency multiplier according to the present invention, and is adapted to average inter-stage errors.

The phase compensator is connected in common to the branch delay lines of the VCDL which provide the input signals to the frequency multiplier according to the present invention, and is adapted to average inter-stage errors. FIG. 11 is a circuit diagram showing an embodiment of the phase compensator.

With reference to FIG. 11, the phase compensator 470 includes a first phase compensation stage 472 and a second phase compensation stage 474. Although the phase compensator 470 is shown in FIG. 11 to have a two-stage structure, it may have a larger number of stages according to a given situation.

The first phase compensation stage 472 includes a plurality of pairs of first inverters 472-1 to 472-15, each pair for receiving branch signals of a corresponding one of the input signals $A_1$ to $A_8$ from the branch delay lines of the VCDL. The first phase compensation stage 472 is adapted to combine output signals from adjacent ones of the first inverters 472-1 to 472-15 to generate a plurality of first compensation signals $B_1$ to $B_8$ each compensated for a delay error of a corresponding one of the branch delay lines of the VCDL.

The second phase compensation stage 474 includes a plurality of pairs of second inverters 474-1 to 474-16, each pair for receiving branch signals of a corresponding one of the first compensation signals $B_1$ to $B_8$ from the first phase compensation stage 472. The second phase compensation stage 474 is adapted to combine output signals from adjacent ones of the second inverters 474-1 to 474-16 to generate a plurality of second compensation signals $C_1$ to $C_8$ each compensated for a delay error of a corresponding one of the first compensation signals $B_1$ to $B_8$.

For example, if a stage corresponding to the input signal $A_8$ from the VCDL has a static phase error terror larger than those of stages corresponding to the other input signals, the static phase error terror is reduced to half thereof through the first phase compensation stage, and then to ¼ thereof by performing phase compensation every other stage through the second phase compensation stage.

With this phase compensator, each inter-stage delay of the output of the VCDL can be obtained as in Table 2 below.

The N to K multiplexer 480 is adapted to multiplex n input signals $A_1$ to $A_N$ from the VCDL into k output signals $B_1$ to $B_k$. The last one $B_k$ of the output signals $B_1$ to $B_k$ from the N to K multiplexer 480 is fed back to a phase detector and then compared with a reference input signal.

At this time, the frequency multiplication ratio of the frequency multiplier is changed from initial N/2 to K/2. For example, when N=8, the frequency multiplier operates at a frequency corresponding to 8/2=4 times. Thereafter, when K=7 under control of the controller, a reference clock is locked to the seventh signal of the VCDL and the multiplier inputs become $D_1, D_2, D_3, D_4, D_5, D_6$ and $D_7$, so the multiplier provides an output frequency which is 7/2 times as fast as the reference clock. Meanwhile, if N is an even number, it is possible to significantly reduce time required for locking the last Kth signal, as compared with a conventional frequency multiplier. For example, if K=4, the fourth signal of the VCDL is inputted and compared with the reference input signal in the conventional frequency multiplier; however, the eighth signal of the VCDL corresponding to N is inputted and compared with the reference input signal in the frequency multiplier with the multiplexer according to the present invention. Then, four signals $D_1, D_3, D_5$ and $D_7$ are inputted to the multiplier through the N to K multiplexer. As a result, each inter-stage delay of the VCDL output becomes Tx2/8, which is the same as that when K=4.

The frequency multiplier according to the present invention is designed in such a manner that the frequency multiplication ratio can be changed to 8/2, 7/2, 6/2, 5/2 or 4/2 under control of the controller under the condition that N=8. The following Table 3 shows output signals from the VCDL inputted to the frequency multiplier and the last one thereof compared by the phase detector, according to each frequency multiplication ratio.

TABLE 2

| Each inter-stage delay of VCDL output | $t_d\,t_d\,t_d\,t_d\,t_d\,t_d\,t_d\,t_d + t_{error}$ |
|---|---|
| Each inter-stage delay after being passed through first phase compensation stage | $(t_d + t_d)/2\ (t_d + t_d)/2\ (t_d + td)/2\ (t_d + t_d)/2\ (t_d + t_d)/2\ (t_d + t_d)/2$ $(t_d + t_d + t_{error})/2\ ((t_d + t_d + t_{error})/2$ |
| Each inter-stage delay after being passed through second phase compensation stage | $(2t_d + 2t_d)/4\ (2t_d + 2t_d)/4\ (2t_d + 2t_d)/4\ (2t_d + 2t_d)/4\ (2t_d + 2t_d + t_{error})/4$ $(2t_d + 2t_d + t_{error})/4\ (2t_d + 2t_d + t_{error})/4\ (2t_d + 2t_d + t_{error})/4$ |

Recently, as electronic products gradually become smaller in size for portability and mobility, low power has become an important factor for the design of a microprocessor. Various methods for low power have been introduced, which may be, for example, a dynamic power supply voltage adjustment, a dynamic body bias adjustment, a dynamic frequency adjustment, etc. The frequency multiplier according to the present invention can dynamically multiply an input frequency using such a method to dynamically adjust the frequency.

Figure 12:
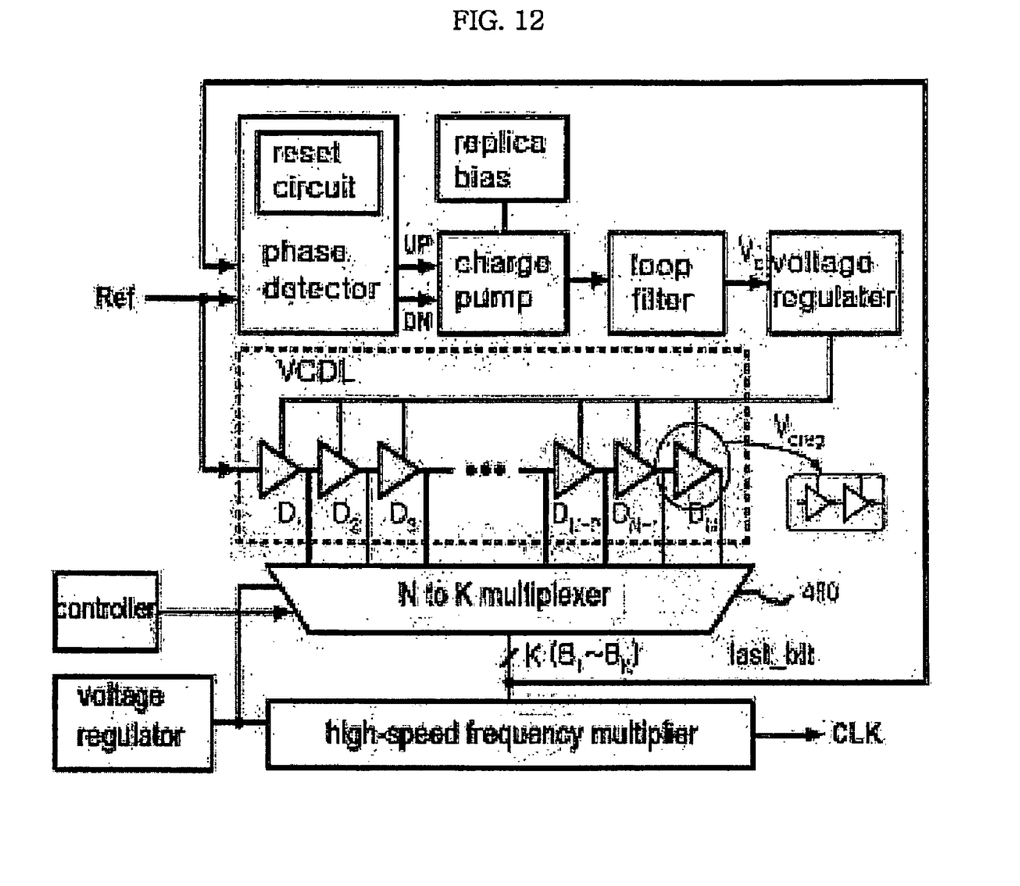
FIG. 12 is a block diagram of a dynamic frequency multiplier which is capable of dynamically controlling a frequency multiplication ratio by introducing a DLL and an N to K multiplexer.

FIG. 12 is a block diagram of a dynamic frequency multiplier which is capable of dynamically controlling a frequency multiplication ratio by introducing a DLL and an N to K multiplexer. The operating principle of the dynamic frequency multiplier is as follows. Signals from the respective stages of the VCDL are passed through the N to K multiplexer 480 under control of a controller. Then, K signals are inputted to the multiplier, and the last one thereof is fed back to a phase detector and then compared with a reference input signal. After the lapse of a predetermined tracking time, the Kth signal of the VCDL is locked to the reference input signal.

TABLE 3

| Multiplication ratio | Output signals from VCDL inputted to multiplier | | | | | | | | VCDL signal compared |
|---|---|---|---|---|---|---|---|---|---|
| | B1 | B2 | B3 | B4 | B5 | B6 | B7 | B8 | |
| M = 4 | D1 | D2 | D3 | D4 | D5 | D6 | D7 | D8 | D8 |
| M = 3.5 | D1 | D2 | D3 | D4 | D5 | D6 | D7 | gnd | D7 |
| M = 3 | D1 | D2 | D3 | D4 | D5 | D6 | gnd | gnd | D6 |
| M = 2.5 | D1 | D2 | D3 | D4 | D5 | gnd | gnd | gnd | D5 |
| M = 2 | D1 | gnd | D3 | gnd | D5 | gnd | D7 | gnd | D8 |
| M = 1.5 | D1 | gnd | D3 | gnd | D5 | gnd | gnd | gnd | D6 |
| M = 1 | D1 | gnd | gnd | gnd | D5 | gnd | gnd | gnd | D8 |

Figure 13:
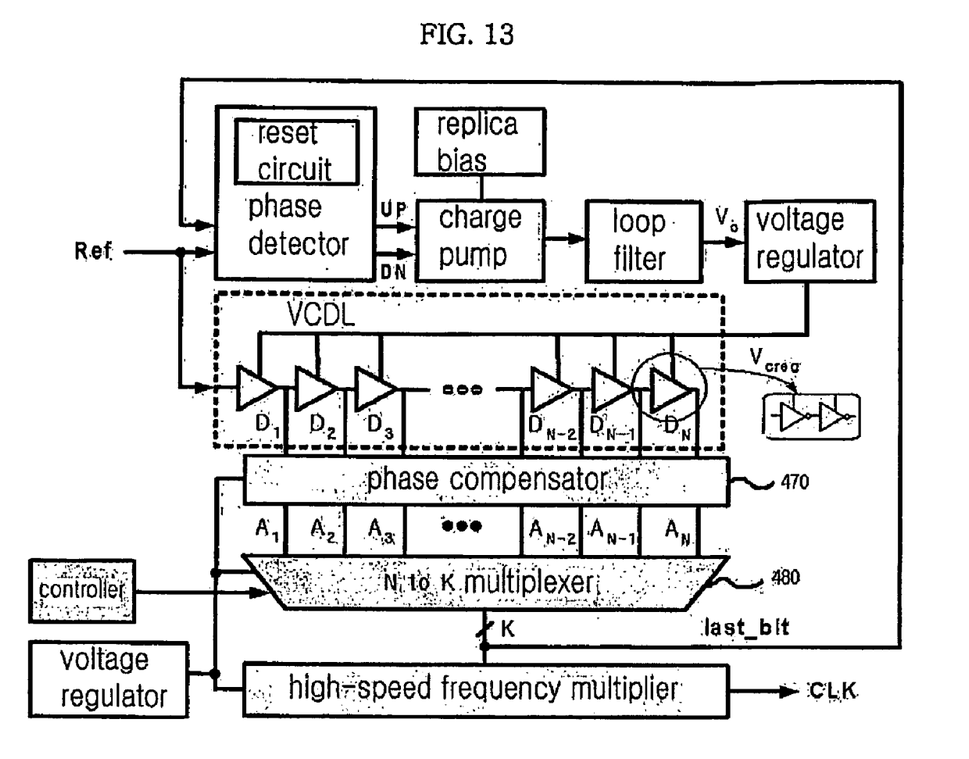
FIG. 13 is a block diagram of a DLL-based high-speed clock generator which includes the frequency multiplier according to the present invention and a delay error corrector.

FIG. 13 is a block diagram of a DLL-based high-speed clock generator which includes the frequency multiplier according to the present invention and a delay error corrector.

The DLL adjusts the voltage of the VCDL with respect to a reference input signal of 400 MHz to phase-align the output of the VCDL and the reference input signal. The phase compensator 470 is used to equalize delay levels of the respective stages of the VCDL and average static phase errors thereof. As a result, jitter at each stage of the VCDL is reduced to ¼. These error-reduced signals are inputted to the N to K multiplexer 480, and then adjusted and inputted to the frequency multiplier under control of the controller. The frequency multiplier according to the present invention can provide an output frequency based on a frequency multiplication ratio of 4, 3.5, 3, 2.5 or 2 under the condition that N=8. Hence, the frequency multiplier can operate over a wider frequency range and obtain a small error of 15 ps at the highest-speed clock corresponding to the multiplication ratio of 4.

INDUSTRIAL APPLICABILITY

As apparent from the above description, the present invention provides a frequency multiplier which is capable of, before a signal from a voltage-controlled delay line is inputted thereto, selectively precharging and predischarging internal nodes thereof to remove a parasitic capacitance between the internal nodes, so that it can operate at high speed. The frequency multiplier can also be miniaturized by employing a phase interpolator which can be implemented with a digital circuit and be simply and conveniently designed. In addition, the frequency multiplier can dynamically control a frequency multiplication ratio by employing an N to K multiplexer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A frequency multiplier comprising:
a plurality of voltage regulators connected in parallel between first and second common nodes, each of the voltage regulators regulating levels of voltages at the first and second common nodes in response to a corresponding one of input signals from a voltage-controlled delay line;
an input buffer for charging the first common node or discharging the second common node in response to a feedback signal;
an output buffer driven by the voltage level of any one of the first and second common nodes for regulating a level of a voltage at an output node and outputting a frequency-multiplied clock signal and the feedback signal corresponding to the voltage level of the output node;
a discharge circuit connected to the first common node for discharging the first common node before a rising edge of each of the input signals from the voltage-controlled delay line is inputted; and
a charge circuit connected to the second common node for charging the second common node before the rising edge of each of the input signals from the voltage-controlled delay line is inputted.

2. The frequency multiplier as set forth in claim 1, wherein each of the voltage regulators includes:
a plurality of inverters connected in series for delaying the corresponding input signal from the voltage-controlled delay line for a predetermined period of time;
a first N-channel Metal-Oxide Semiconductor (NMOS) transistor having a first terminal connected to the first common node and a gate terminal for receiving the signal delayed by the inverters, the first NMOS transistor being driven by the delayed signal received at the gate terminal thereof; and
a second NMOS transistor having a first terminal connected to a second terminal of the first NMOS transistor, a second terminal connected to the second common node and a gate terminal for receiving the corresponding input signal from the voltage-controlled delay line, the second NMOS transistor being driven by the corresponding input signal received at the gate terminal thereof.

3. The frequency multiplier as set forth in claim 1, wherein the input buffer includes:
a PMOS transistor having a first terminal connected to a voltage regulated to be unaffected by power noise, a second terminal connected to the first common node and a gate terminal for receiving the feedback signal from the output buffer, the PMOS transistor regulating the voltage level of the first common node in response to the feedback signal received at the gate terminal thereof; and
an NMOS transistor having a first terminal connected to the second common node, a second terminal connected to a ground terminal and a gate terminal for receiving the feedback signal from the output buffer, the NMOS transistor regulating the voltage level of the second common node in response to the feedback signal received at the gate terminal thereof.

4. The frequency multiplier as set forth in claim 1, wherein the output buffer includes:
a PMOS transistor having a first terminal connected to a voltage regulated to be unaffected by power noise, a second terminal connected to the output node and a gate terminal for receiving the voltage at the first common node, the PMOS transistor being driven by the level of the voltage received at the gate terminal thereof to regulate the voltage level of the output node;

an NMOS transistor having a first terminal connected to the output node, a second terminal connected to a ground terminal and a gate terminal for receiving the voltage at the second common node, the NMOS transistor being driven by the level of the voltage received at the gate terminal thereof to regulate the voltage level of the output node;

a feedback signal output stage including a plurality of first inverters connected in series to the output node for delaying an output signal from the output node for a predetermined period of time and providing the delayed signal as the feedback signal; and a clock signal output stage including a plurality of second inverters connected in series to the output node for delaying the output signal from the output node for a predetermined period of time and providing the delayed signal as the frequency-multiplied clock signal.

5. The frequency multiplier as set forth in claim 1, wherein the discharge circuit includes a plurality of transmission gates, the transmission gates being selectively turned on according to a frequency multiplication ratio.

6. The frequency multiplier as set forth in claim 5, wherein the discharge circuit further includes:
  a first NAND gate for performing a logic operation with respect to bit values corresponding to the frequency multiplication ratio;
  a first inverter for inverting an output signal from the first NAND gate to turn on a first one of the plurality of transmission gates;
  a second NAND gate for performing a logic operation with respect to at least two of the bit values corresponding to the frequency multiplication ratio;
  a second inverter for inverting an output signal from the second NAND gate to turn on a second one of the plurality of transmission gates;
  a third inverter for inverting a selected one of the bit values corresponding to the frequency multiplication ratio; and
  a fourth inverter for inverting an output signal from the third inverter to turn on a third one of the plurality of transmission gates.

7. The frequency multiplier as set forth in claim 1, wherein the charge circuit includes a plurality of transmission gates, the transmission gates being selectively turned on according to a frequency multiplication ratio.

8. The frequency multiplier as set forth in claim 7, wherein the charge circuit further includes:
  a first NAND gate for performing a logic operation with respect to bit values corresponding to the frequency multiplication ratio;
  a first inverter for inverting an output signal from the first NAND gate to turn on a first one of the plurality of transmission gates;
  a second NAND gate for performing a logic operation with respect to at least two of the bit values corresponding to the frequency multiplication ratio;
  a second inverter for inverting an output signal from the second NAND gate to turn on a second one of the plurality of transmission gates;
  a third inverter for inverting a selected one of the bit values corresponding to the frequency multiplication ratio; and
  a fourth inverter for inverting an output signal from the third inverter to turn on a third one of the plurality of transmission gates.

9. The frequency multiplier as set forth in claim 1, further comprising a multiplexer for multiplexing a first number of input signals from the voltage-controlled delay line into a second number of output signals, the multiplexer feeding a last one of the output signals back to a phase detector such that the last signal is compared with a reference input signal.

10. The frequency multiplier as set forth in claim 1 or 9, further comprising:
  a first phase compensation stage including a plurality of pairs of first inverters, each pair for receiving branch signals of a corresponding one of the input signals from the voltage-controlled delay line, the first phase compensation stage combining output signals from adjacent ones of the first inverters to generate a plurality of first compensation signals each compensated for a delay error of a corresponding branch delay line of the voltage-controlled delay line; and
  a second phase compensation stage including a plurality of pairs of second inverters, each pair for receiving branch signals of a corresponding one of the first compensation signals from the first phase compensation stage, the second phase compensation stage combining output signals from adjacent ones of the second inverters to generate a plurality of second compensation signals each compensated for a delay error of a corresponding one of the first compensation signals.

* * * * *